(12) United States Patent
Neet et al.

(10) Patent No.: US 12,231,000 B2
(45) Date of Patent: Feb. 18, 2025

(54) DIAMOND COIL STATOR WITH PARALLEL PATHS AND BALANCED WINDING ARRANGEMENT

(71) Applicant: BorgWarner Inc., Auburn Hills, MI (US)

(72) Inventors: Kirk Neet, Noblesville, IN (US); Joshua B. Lahrman, Fishers, IN (US); Matthew R. Conner, Franklin, IN (US); David A. Fulton, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 301 days.

(21) Appl. No.: 17/716,144

(22) Filed: Apr. 8, 2022

(65) Prior Publication Data

US 2022/0329116 A1     Oct. 13, 2022

Related U.S. Application Data

(60) Provisional application No. 63/173,236, filed on Apr. 9, 2021.

(51) Int. Cl.
| | | |
|---|---|---|
| *H02K 1/16* | (2006.01) | |
| *H02K 3/12* | (2006.01) | |
| *H02K 3/28* | (2006.01) | |
| *H02K 3/48* | (2006.01) | |

(52) U.S. Cl.
CPC .............. *H02K 1/165* (2013.01); *H02K 3/12* (2013.01); *H02K 3/28* (2013.01); *H02K 3/48* (2013.01)

(58) Field of Classification Search
CPC ............ H02K 1/165; H02K 3/12; H02K 3/28; H02K 3/48
See application file for complete search history.

(56) References Cited

U.S. PATENT DOCUMENTS

| | | | |
|---|---|---|---|
| 10,651,700 B2 | 5/2020 | Koga | |
| 10,666,104 B2 | 5/2020 | Koga | |
| 2008/0201935 A1 | 8/2008 | Nakayama et al. | |
| 2012/0007460 A1* | 1/2012 | Kitamura | H02K 3/12 310/195 |
| 2014/0042862 A1* | 2/2014 | Ishigami | H02K 3/12 310/187 |
| 2015/0303754 A1* | 10/2015 | Fukuda | H02K 3/50 310/71 |
| 2020/0244125 A1* | 7/2020 | Neet | H02K 3/28 |
| 2020/0244126 A1 | 7/2020 | Neet et al. | |

* cited by examiner

*Primary Examiner* — Thomas Truong
(74) *Attorney, Agent, or Firm* — Maginot, Moore & Beck, LLP

(57) ABSTRACT

A stator for an electric machine includes a core and a multi-phase winding arrangement positioned on the core. Each phase of the winding arrangement includes a plurality of parallel paths defining a plurality of poles for the electric machine. Each parallel path includes a plurality of coils positioned on the core, each coil defined by coil legs and end turns. The coil legs include left legs and right legs extending through the slots of the core. The left legs and right legs of each coil are connected by first end turns at one end of the core and second end turns at an opposite end of the core. Each pole of the electric machine is associated with a pole slot set comprised of multiple slots on the stator core. For each pole slot set, legs for each parallel path extend through one of the slots of said pole slot set.

20 Claims, 9 Drawing Sheets
(7 of 9 Drawing Sheet(s) Filed in Color)

DIAMOND COIL STATOR WITH PARALLEL PATHS AND BALANCED WINDING ARRANGEMENT

CROSS-REFERENCE TO RELATED APPLICATIONS

This application claims priority from U.S. provisional patent application No. 63/173,236, filed Apr. 9, 2021, the entire contents of which are incorporated herein by reference.

FIELD

The present disclosure relates to the field of electric machines, and more particularly, stator winding arrangements.

BACKGROUND

Winding arrangements for stators are known, including winding arrangements with diamond-shaped coils. Electric machines that include such winding arrangements are particularly suited for certain applications, but improvements to such electric machines would be advantageous. For example, it would be desirable to improve the electrical balancing in such machines in the event the rotor/stator arrangement of the electric machine is not perfectly concentric (e.g., due to manufacturing tolerances). Additionally, it would be advantageous to provide a winding arrangement for such an electric machine wherein all of the leads are conveniently located in a limited region of the electric machine.

SUMMARY

In at least one embodiment, a stator for an electric machine includes a core defining a plurality of slots and a multi-phase winding arrangement positioned on the core. Each phase of the winding arrangement includes a plurality of parallel paths defining a plurality of poles for the electric machine. Each parallel path includes a plurality of coils positioned on the core. Each coil is defined by coil legs and end turns. The coil legs include left legs and right legs extending through the slots of the core, wherein the left legs and right legs of each coil are connected by first end turns at one end of the core and second end turns at an opposite end of the core. Each pole of the electric machine is associated with a pole slot set comprised of multiple slots on the stator core. For each pole slot set, legs for each parallel path extend through one slot of said pole slot set such that conductors for all of the parallel paths of said phase of the winding arrangement are retained in each pole slot set.

In at least one additional embodiment, a stator for an electric machine includes a core defining a plurality of slots and a multi-phase winding arrangement including coil connections. The winding arrangement is positioned on the core with each phase of the winding arrangement comprising a plurality of parallel paths defining a plurality of poles for the electric machine. Each parallel path includes a plurality of coils positioned on the core and a plurality of coil connections extending between the plurality of coils. Each coil is defined by coil legs and end turns. The coil legs include left legs and right legs extending through the slots of the core. The left legs and right legs of each coil are connected by first end turns at one end of the core and second end turns at an opposite end of the core. Each pole of the winding arrangement is associated with a pole slot set including at least two slots. Slots containing the coil legs of a first parallel path are positioned to the left of slots containing the coil legs of a second parallel path for a first group of pole slot sets. At least two of the coil connections crisscross one another such that slots containing the coil legs of the first parallel path are positioned to the right of slots containing the coil legs of the second parallel path for a second group of the pole slot sets.

In at least one further embodiment, a stator for an electric machine comprises a core including a plurality of slots and a multi-phase winding arrangement positioned on the core, each phase of the winding arrangement comprising a plurality of parallel paths that extend through a plurality of pole slot sets. Each parallel path is comprised of a plurality of diamond-shaped coils arranged around the core with coil legs positioned in layers within the slots. Each phase of the winding arrangement defines a plurality of poles and each pole is associated with a pole slot set including a left slot, a middle slot, and a right slot. For each pole slot set, coil legs of a first parallel path are positioned in a first half of the layers of the left slot, coil legs of a second parallel path are positioned in the first half of the layers of the middle slot, coil legs for a third slot set are positioned in a second half of the layers of the middle slot, and coil legs for a fourth slot set are positioned in the second half of the layers of the left slot.

The above described features and advantages, as well as others, will become more readily apparent to those of ordinary skill in the art by reference to the following detailed description and accompanying drawings. While it would be desirable to provide an electric machine that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 1:
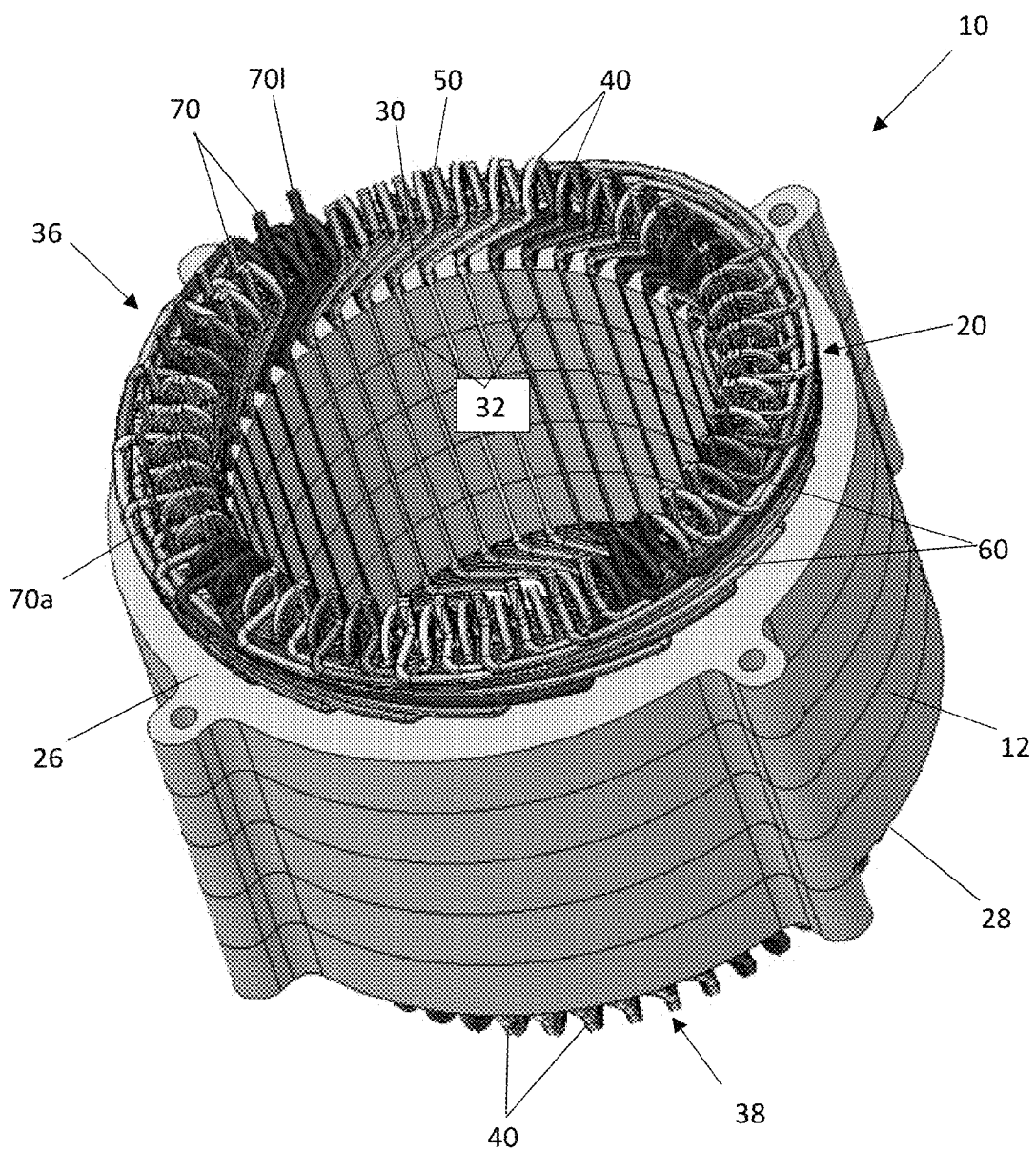
FIG. 1 is a perspective view of lead end of a stator including a diamond coil winding arrangement.

A stator for an electric machine is disclosed herein. With general reference to FIGS. 1 and 2, opposite sides of the stator 10 are shown. The stator 10 includes a stator core 12 with a multi-phase winding arrangement 20 positioned on the stator core 12. Each phase of the winding arrangement 20 includes a plurality of parallel-connected paths (which may also be referred to herein as simply "parallel paths") defining a plurality of poles for the electric machine. Each parallel path includes a plurality of coils 30 positioned on the core, and each coil is defined by coil in-slot conductors 32, end turns 40 that extend between the in-slot conductors 32, and coil leads 50. Coil connections 60 provide serial connections between the coils on a first end 26 of the stator core 12. As described in further detail herein, each pole in each phase of the winding arrangement is defined by a pole slot set comprised of multiple slots on the stator core. For each pole slot set, all parallel paths of the associated phase of the winding arrangement are retained in the slots of the pole slot set.

Stator Core

Figure 3:
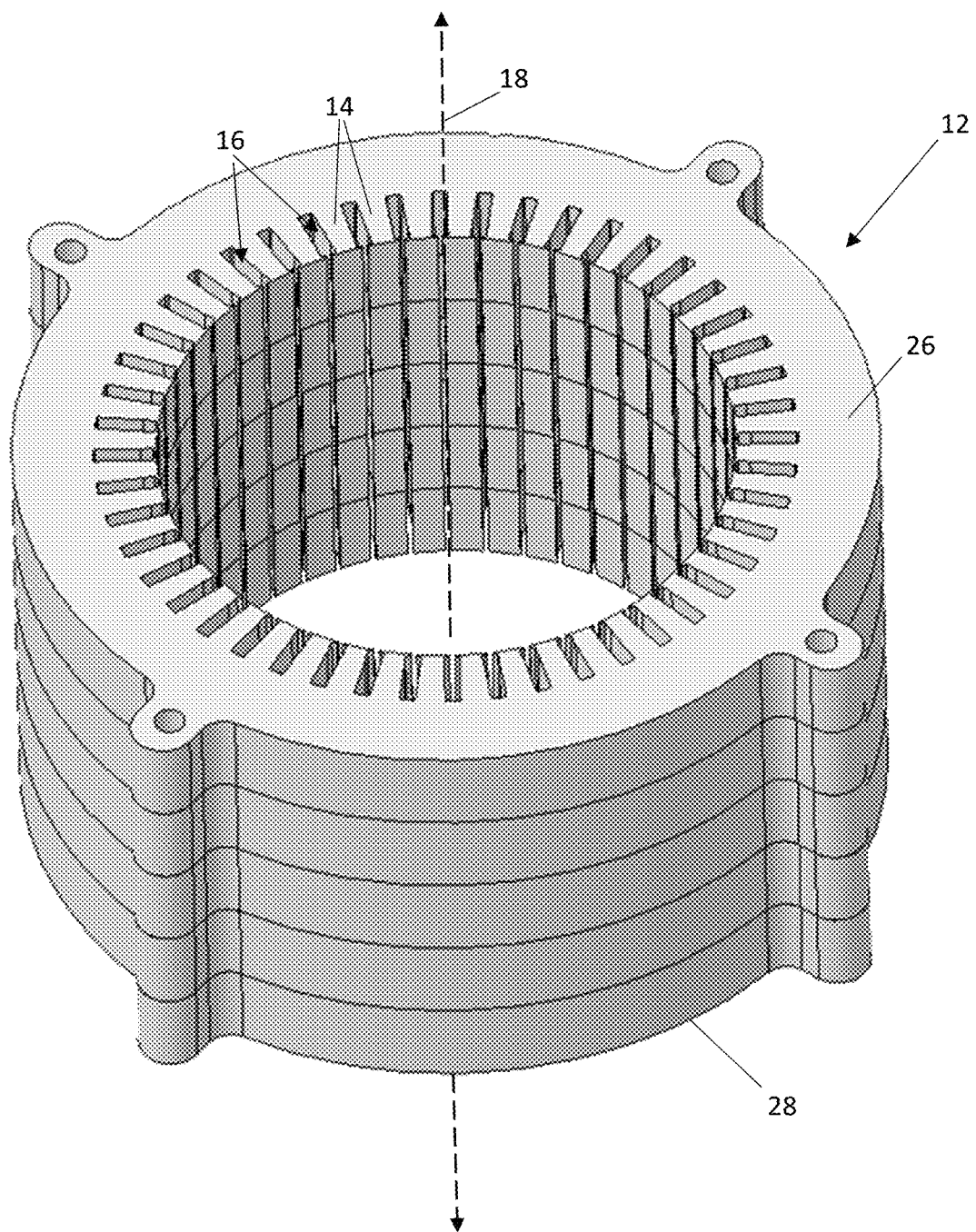
FIG. 3 is a perspective view of the stator core of FIG. 1 in isolation from the winding arrangement.

FIG. 3 shows a view of the stator core 12 in isolation from the winding arrangement 20. The stator core 12 is comprised of a ferromagnetic material and is typically formed from a plurality of steel sheets that are stamped and stacked upon one another to form a lamination stack. The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed inwardly toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 26 to a second end 28 of the core.

The slots 16 may be open or semi-closed along the inner perimeter surface of the stator core 12. When the slots 16 are semi-closed, each slot 16 has a width that is smaller at the inner perimeter surface than at more radially outward positions (i.e., slot positions closer to the outer perimeter surface). When the slots are open, conductors may be inserted into the slots from the ID. In addition to the radial openings to the slots 16 through the inner perimeter surface (i.e., for open and semi-closed slots), axial openings to the slots 16 are also provided the opposite ends 26, 28 of the stator core 12.

As shown in FIG. 1, the stator core 12 is configured to retain the winding arrangement 20 within the slots 16 of the stator core 12. The winding arrangement 20 is formed from a plurality of interconnected coils that are retained within the slots 16. The coils are comprised of multiple segments of copper or other electrically conductive material that form loops. The loops generally extend through the slots and wrap around the teeth of the core.

Coils of Winding Arrangement

Figure 4:
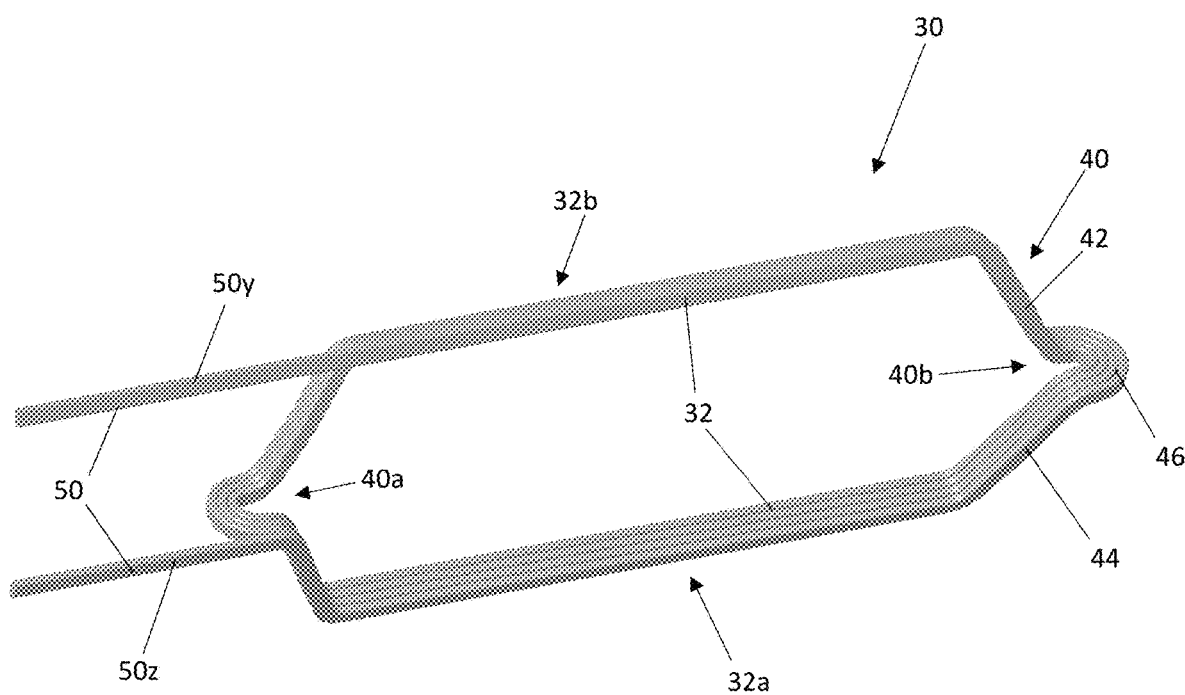
FIG. 4 is a perspective view of a diamond-shaped coil of the winding arrangement of FIG. 1, the coil including in-slot segments, end-turns, and coil leads.

With reference now to FIG. 4, one of the coils 30 of the winding arrangement 20 is shown in isolation from the winding arrangement. As shown in FIG. 4, each coil is a diamond-shaped coil that includes a plurality of straight in-slot conductors 32, a plurality of end turns 40, and a plurality of coil leads 50. The straight in-slot conductors 32 (which may also be referred to herein as "in-slot segments" or "legs") extend through the slots 16 from one end of the core 12 to the opposite end of the core. Two groups 32a and 32b of in-slot segments 32 are associated with each coil 30. Each group 32a, 32b of in-slot segments 32 extends through a different slot of the core. Multiple in-slot segments are included in each group 32a, 32b. In the embodiment of FIG. 4, each group 32a, 32b includes four in-slot segments 32. These four in-slot segments are arranged in single file within the slots 16 (i.e., in "layers" of conductors within the slot). Each slot is configured to retain some number of in-slot segments in layers of the slot. In at least one embodiment, the slots 16 are configured to retain twice the number of in-slot segments 32 as the number of conductors of each group 32a, 32b (e.g., each group 32a, 32b includes four in-slot conductors 32, and each slot is configured with a total of eight layers of in-slot conductors).

In addition to the in-slot segments 32, each coil 30 further includes end turns 40 and coil leads 50. The end turns 40 and coil leads 50 are provided as part of winding heads 36 and 38 of the winding arrangement 20, and are therefore arranged axially beyond the respective ends 26, 28 of the stator core 12. As shown in FIG. 4, the end turns 40 (which may be also referred to herein as "end loops") extend between the two groups 32a, 32b of in-slot segments. In other words, each end turn 40 provides a bridge from the end of a conductor in one group 32a to the end of a conductor in another group 32b. Each end turn 40 includes a first angled portion 42 (which may also be referred to herein as a "first segment") and a second angled portion 44 (which may also be referred to herein as a "second segment"). The first segment 42 extends along a first end turn direction that is angled relative to the axial direction (i.e., angled relative to center axis 18). Similarly, the second segment 44 extends along a second end turn direction that is angled relative to the axial direction. The two segments 42, 44 meet at a vertex 46 of the end turn. The vertex 46 defines the portion of the end turn where the coil 30 changes direction as it loops around the core (e.g., changing from a direction moving axially away from the core back to a direction moving axially toward to core). The angled portions 42, 44 of the coil 30 and the associated vertices result in a coil with a diamond-like shape.

Similar to the in-slot segments 32, the end turns 40 are also comprised of a conductive material, such as copper. As discussed in further detail below in association with FIGS. 9A and 9B, the end turns 40 may be formed by providing conductor loops (i.e., "racetracks") that are subsequently spread apart to form the desired conductor shape. Alternatively, in at least some embodiments, the in-slot segments 32 may be provided by I-pin conductors and the end turns 40 and coil leads 50 that are printed on the ends of the in-slot segments 32 after the I-pin conductors are inserted into the slots 16 of the core 12. An example of such a winding is disclosed in co-pending U.S. patent application Ser. No.

17/716,092, filed Apr. 8, 2022, the entire contents of which are incorporated by reference herein.

With continued reference to FIG. 4, each coil 30 includes two coil leads 50. Each coil lead 50 provides a path into or out of the looping portions of each coil 30. In other words, if the coil body is considered to include the in-slot segments 32 and the end turns 40 that form loops, the coil leads 50 provide a path leading to the coil body. FIG. 4 shows a first coil lead 50y that may be considered a "straight" coil lead because it extends only in an axial direction directly from the in-slot segments 32, and is not angled like the segments 42, 44 of the end turn 40. FIG. 4 also shows a second coil lead 50z that may be considered "bent" or "angled" because a portion of the coil lead 50z follows the angle of the end turn prior to extending away from the coil body in the axial direction near the vertex 46 of the end turn 40. While both a straight coil lead 50y and a bent coil lead 50z are shown in FIG. 3, in at least one embodiment, both coil leads 50 are bent coil leads (i.e., both coil leads follow the angle of the end turn, similar to the second coil lead 50z), or both coil leads are straight coil leads 50y. As described in further detail herein, when both coil leads 50 are bent coil leads the winding arrangement is better configured for radial insertion of the coils 30 into the slots 16 via the ID of the core 12.

As will be recognized from the foregoing, the coil of FIG. 4 is a diamond-shaped coil 30 that includes a strand of wire that is wrapped in a loop to include a set of left legs 32a, a set of right legs 32b, first end turns 40a, and second end turns 40b. The four left legs 32a are all elongated in an axial direction and parallel to one another. Similarly, the four right legs 32b that are all elongated in an axial direction and parallel to one another (and also parallel to the left legs 32a). The first end turns 40a connect the right legs to the left legs at one end of the coil 30, and the second end turns 40b connect the right legs to the left legs at the opposite end of the coil 30. The legs are all connected in series such that a coil is formed, allowing electricity to flow from a first lead 50a at one end of the coil, through all of the legs, and to a second lead 50b at the same end of the coil 30.

Complete Winding Arrangement

The plurality of coils 30 are connected together to form the winding arrangement 20. To this end, the winding head 36 on the first end 26 of the core 12 includes various head segments, including the end turn segments 40 and coil leads 50 discussed above, as well as a plurality of connection segments 60 that provide connections between the coils. As shown in FIG. 1, each connection segment 60 extends between the coil leads 50 of two different coils. In the embodiment disclosed herein, the connection segments 60 extend in a circumferential manner between the coils at a position that is radially outward from the end turns 40. Similar to the coils 30, the connection segments are also comprised of copper or another electrically conductive material that is typical in winding arrangements for electric machines.

Together, the coils 30 and the connection segments 60s form a winding arrangement 20 with a plurality of phase windings. In at least one embodiment, the winding arrangement includes three phase windings (e.g., phase U windings, phase V windings, and phase W windings) with multiple paths for each phase. The three phase windings may be star ("Y") or delta ("Δ") connected, depending on the desired winding configuration.

A plurality of path leads 70 are provided on the first end of the stator core along with the end turns 40 and coil connections 60. The leads 70 define the entry and exit conductors into each parallel path of the stator. Because the stator is a three phase machine, and because there are four parallel paths per phase, a total of twelve leads (i.e., 70a through 70l) are shown in the outer layers of the winding in the embodiment of FIG. 1. Twelve additional leads are provided in more inward layers of the winding. The leads for each phase are connected in parallel (i.e., each phase includes four parallel paths). The plurality of path leads 70 are all conveniently positioned such that they generally extend from a single quadrant of the stator 10. In other words, as shown in FIG. 1, the path leads 70a through 70l are all arranged within an arc of about 90° on the stator core (e.g., an arc of less than 100°, and preferably, 90° or less). The end turns 40, coil leads 50, coil connections 60 and path leads 70 form a first winding head 36 on a one end 26 of the stator core.

Figure 2:
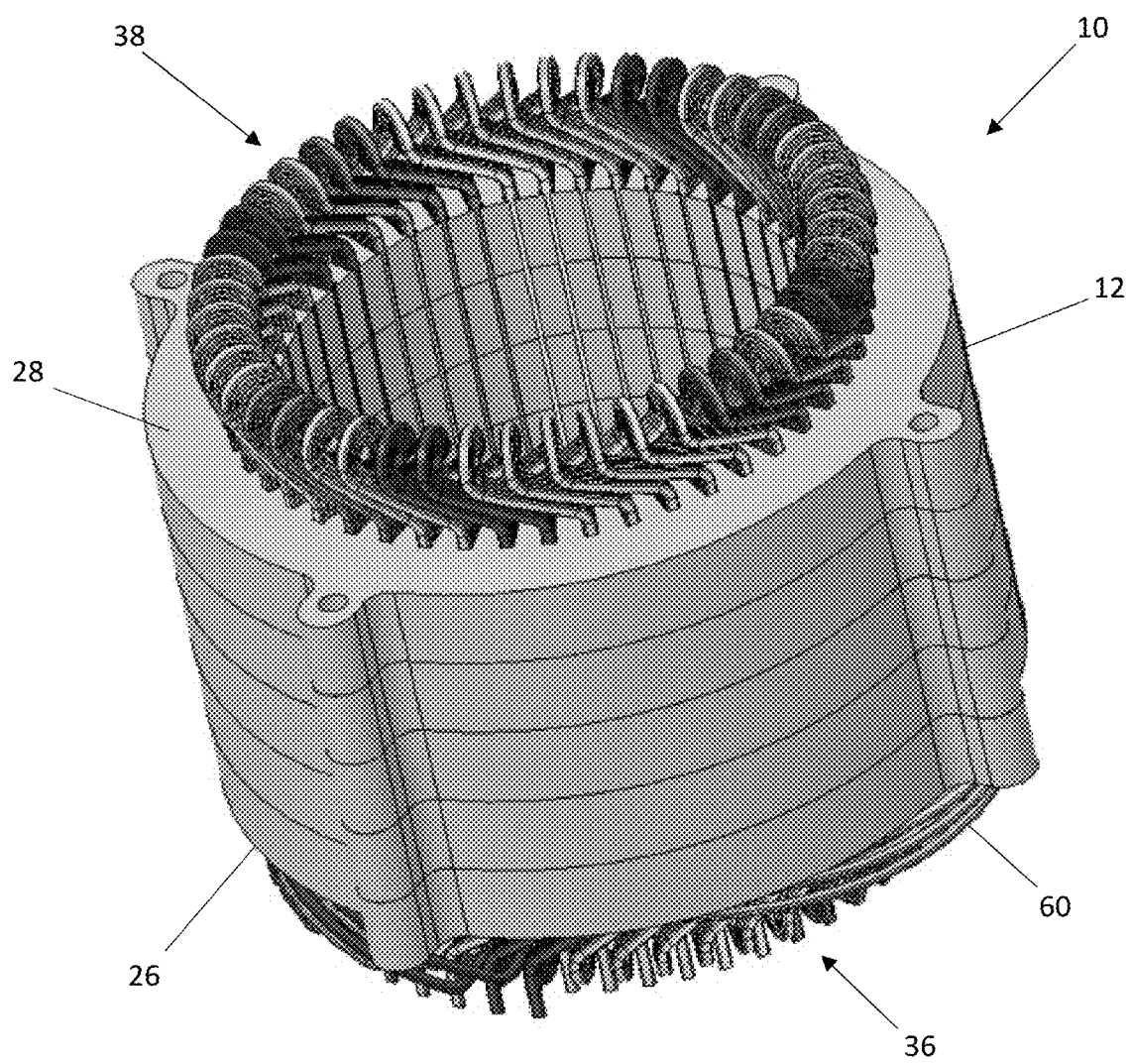
FIG. 2 shows a perspective view of an opposite end of the stator of FIG. 1.

FIG. 2 shows a second winding head 38 provided on the opposite end of the stator core from the first winding head 36. As can be seen in FIG. 2, the winding head 38 only includes end turns 40, and does not include, coil leads 50, connection segments 60, or leads 70. Together FIGS. 1 and 2 show the opposite ends 26, 28 of the stator 10 with the winding heads 36, 38 of the winding arrangement 20 positioned on the stator core 12. The in-slot segments 32 of the coils 30 extend through the slots 16+ between the respective winding heads 36 and 38.

Figure 5:
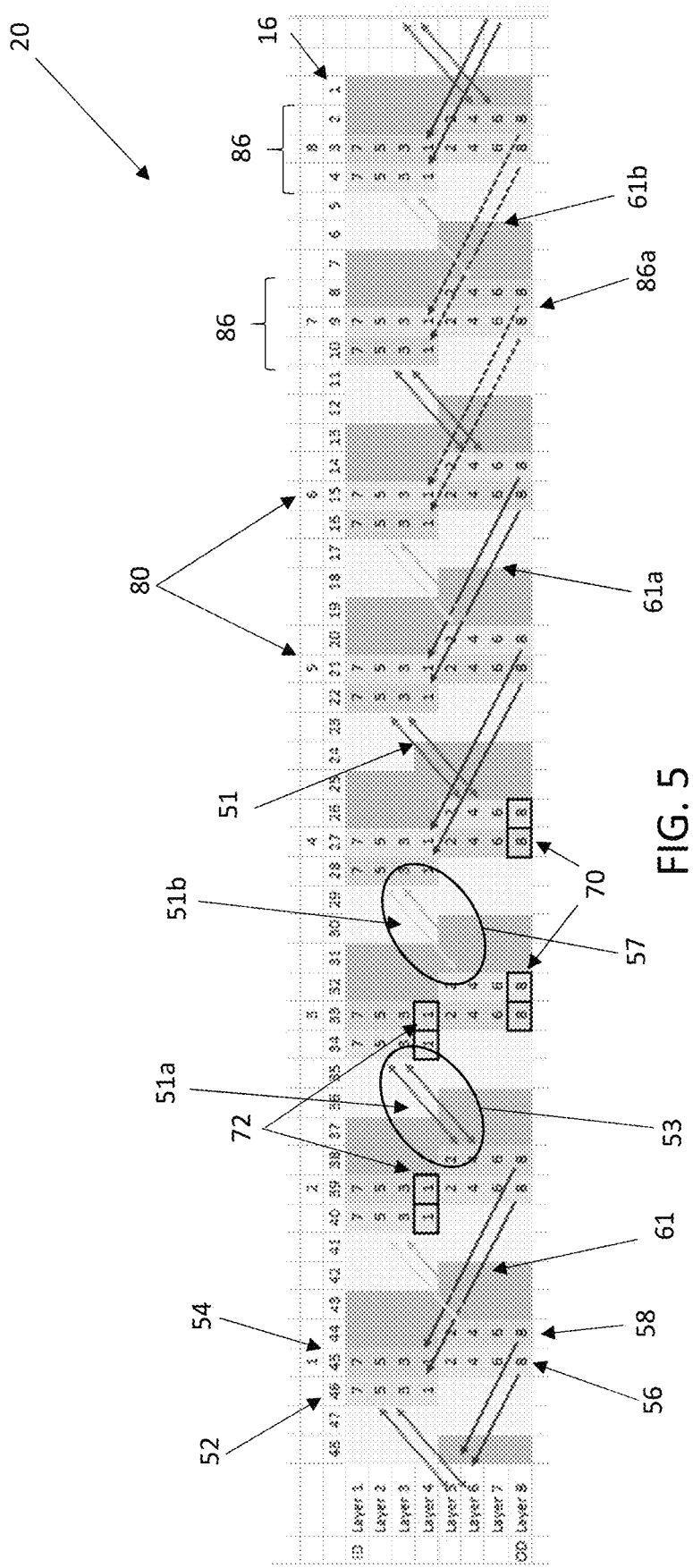
FIG. 5 shows a schematic diagram of the diamond coil winding arrangement of FIG. 1, the diagram illustrating one phase of the winding arrangement with the position of various conductors in the layers of the slots and connections between conductors.

With reference now to FIG. 5 a schematic/tabular view of the winding arrangement 20 is shown with the legs of the diamond-shaped coils arranged in the slots of the stator core. As shown in FIG. 5, forty-eight slots (i.e., slot #1 through slot #48) are included on the core, and each slot includes eight layers of conductors (i.e., eight in-slot segments 32 extend axially through each slot arranged in a single-file in each slot). As noted on the left side of FIG. 5, these eight layers include "Layer 1" (near the ID of the core) through "Layer 8" (closer to the OD of the core). For simplicity, only one phase of conductors is shown in FIG. 5, and the core and associated stator slots are represented in a linear manner (i.e., not in the actual annular form).

Each phase of the winding arrangement 20 includes four parallel paths of conductors that form coils 30 as they loop around the slots 16 and the path winds around the core 12. Each color in FIG. 5 represents conductors for one of the four parallel paths for one phase of the winding arrangement. Specifically, these four parallel paths are represented in FIG. 5 as a blue path 52, a green path 54, a yellow path 56, and an orange path 58. The numerals 1-8 are overlaid on each the color of each path 52, 54, 56, 58. The odd numerals (i.e., 1, 3, 5, 7) within the color represent in-slot conductors associated with a right leg of a diamond-shaped coil 30, and the even numerals within the color (i.e., 2, 4, 6, 8) represent in-slot conductors associated with a left leg of the same diamond-shaped coil. The double-arrows 51 extending between pairs of the in-slot conductors of the same color illustrate the end turn connections between the left and right legs of a coil (e.g., a green two-sided arrow represents a connection between the left legs and the right legs of the green path 54, etc.). For example, the two-sided arrows 51a within circle 53 shows that coils for the blue path 52 and the green path 54 extend between slots 34 and 39 and slots 33 and 38, respectively. Similarly, the two-sided arrows 51b circle 57 shows that coils for the yellow path 56 and the orange path 58 extend between slot #27 and slot #32 and between slot #28 and slot #33, respectively. It will be appreciated from FIG. 5 that all of the coils 30 have a pitch of five (i.e., the left legs of each coil are separated from the right legs by five slots). The coils 30 are also interleaved on the core 12 with left legs (i.e., in-slot segments 32) of each coil positioned in the outer half of the slot layers (i.e., layers 5-8), and right legs of the same coil positioned in the inner half of the slot layers (i.e., layers 1-4).

With continued reference to FIG. 5, it can be seen that each phase of the winding arrangement 20 defines eight poles 80 (labeled 1-8 above the slot numbers in FIG. 5). Additionally, each pole 80 within a phase of the winding arrangement 20 is associated with a pole slot set 86. In the embodiment of FIG. 5, each pole slot set includes three slots, and each slot houses eight layers of conductors. Each pole slot set 86 also defines a 4-8-4 conductor arrangement such that four conductors of a first parallel path are arranged in inner layers of the left slot, four conductors of a second parallel path are arranged in inner layers of the middle slot, four conductors of a third parallel path are arranged in outer layers of the middle slot, and four conductors of a fourth parallel path are arranged in outer layers of the right slot. For each pole slot set 86, all parallel paths of the associated phase travel through one of the slots of the pole slot set. For example, pole #7 is defined by pole slot set 86*a*, which includes slot #s 8, 9 and 10. In this pole slot set 86*a*, the green path 54 is retained in the inner layers of the left slot (i.e., layers 1-4 of slot #10), the blue path 52 is retained in the inner layers of the middle slot (i.e., layers 1-4 of slot #9), the yellow path 56 is retained in the outer layers of the middle slot (i.e., layers 5-8 of slot #9), and the orange path 58 is retained in the outer layers of the right slot (i.e., layers 5-8 of slot #8).

It will be appreciated from FIG. 5 that the positions of the various paths travel through different slots of the pole slot sets as well as different layers of each slot. For example, the blue path 52 is (i) retained in the inner layers of the left slot in the pole slot sets for poles #1 and #3, (ii) retained in the outer layers of the middle slot in the poles slot sets for poles #2 and #8, (iii) retained in the outer layers of the right slot in the pole slot sets for poles #4 and #6, and (iv) retained in the inner layers of the middle slot in the pole slot sets for poles #5 and #7. Each of the other paths 54, 56 and 58 also travel through the different pole slot sets in a similar manner (i.e., moving around in the left, middle, and right slots of different pole slot sets and in different layers of the slots). As a result, a winding arrangement 20 is formed wherein, for each pole slot set 86, legs 32 for each parallel path 52, 54, 56, 58 extend through one slot of the pole slot set 86 such that conductors for all of the parallel paths 52, 54, 56, 58 of said phase of the winding arrangement are retained in each pole slot set 86. While FIG. 5 specifically shows the parallel paths 52, 54, 56, 58 through the pole slot sets 86 for one phase of the winding arrangement, the pole slot sets for two additional phases of the winding arrangement are also represented in FIG. 5 by the gray shading and white shading. Additionally, the term "adjacent pole slot sets" as used herein refers to two pole slot sets associated with consecutive/adjacent poles. For example, consecutive poles #5 and #6 in FIG. 5 define adjacent pole slot sets (i.e., the pole slot sets 86 show in association with pole #5 and pole #6).

FIG. 5 also illustrates the coil connections 60 that provide series connections between the coils 30 of the winding arrangement 20 (and may also be referred to herein as "series connections"). These coil connections 60 are arranged radially outward from the end turns 40 in the embodiments disclosed herein (see FIG. 1), and are represented in FIG. 5 by red arrows 61. Each red arrow 61 represents a coil connection that connects two different coils via a series connection between coil leads extending from layer #4 of one pole and coil leads extending from layer #8 of different pole. In other words, the red arrows 61 represent coil connections that connect a first coil lead of a first coil (which first coil lead extends from a right leg of the first coil positioned in an inner layer of a slot) to a second coil lead of a second coil (which second coil lead extends from a left leg of the second coil positioned in an outer layer of another slot).

The red arrows 61 in FIG. 5 include both solid line arrows 61*a* and dashed line arrows 61*b*. The solid line arrows 61*a* are coil connections that do not crisscross one another and do not change the position of the path relative to an adjacent path (i.e., two paths are adjacent when the coils of said paths extend through adjacent slots within the pole slot sets). For example, the solid line arrows 61*a* that extend between pole #6 and pole #5 in FIG. 5 do not change the position of the green path 54 relative to the blue path 52 (i.e., the green path 54 is to the left of the blue path 52 in both of the adjacent pole slot sets for pole #5 and pole #6). The coil connections associated with the solid line arrows 61*a* of FIG. 5 all have a pitch of seven. On the other hand, the dashed line arrows 61*a* represent coil 60*b* that do crisscross (i.e., cross over/around one another in a radial and/or axial direction), and thus cause the associated adjacent parallel paths to also crisscross such that the relative coil positions of the two parallel paths are switched within the adjacent pole slot sets. For example, the dashed line arrows 61*b* that extend between pole #8 and pole #7 in FIG. 5 represent coil connections 60 that crisscross and change the position of the coils for the green path 54 relative to the blue path 52 (i.e., the green path 54 is to the left of the blue path 52 in the pole slot set of pole #7, but is to the right of the blue path 52 in the pole slot set for pole #8). The coil connections associated with the dashed line arrows 61*b* of FIG. 5 all have pitches of six or eight (i.e., each coil connection pair associated with adjacent coils have respective pitches of six and eight).

In addition to all of the foregoing, it will also be recognized that FIG. 5 further illustrates the position of the leads for the winding arrangement 20. The leads are represented by black boxes around the associated conductors in FIG. 5. The leads includes outer layer leads 70 (i.e., leads in layer 8) as well as inward layer leads 72 (i.e., leads in layer 4). A total of eight different leads are shown for the winding arrangement 20, including the four black boxes around the "1" conductors in layer 4 of poles #2 and #3, and the four black boxes around the "8" conductors in layer 8 of poles #3 and #4. It will be recognized that each of the leads 70, 72 represented by black boxes in FIG. 5 are either phase leads or neutral leads. The leads 70, 72 extending from poles 2 and 4 in FIG. 5 are of the same type (i.e., both are neutral leads or both are phase leads). The leads 70, 72 extending from pole 3 are also of the same type, but different from the leads extending from poles 2 and 4 (i.e., either phase leads or neutral leads, whatever is different from poles 2 and 4).

Connected Coils of Complete Winding Arrangement

Figure 6:
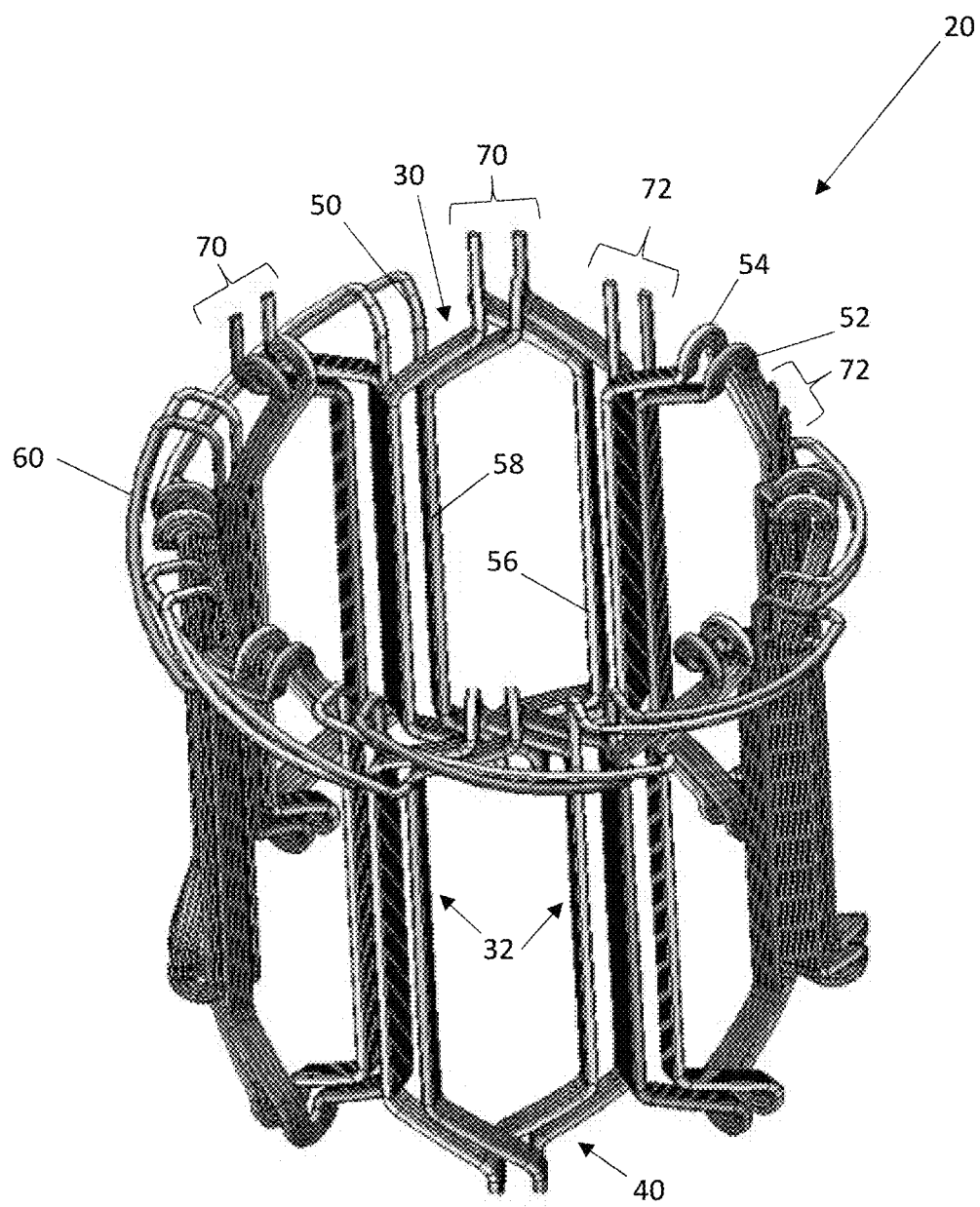
FIG. 6 shows a perspective view of the one phase of the winding arrangement of FIG. 1 in isolation from the stator core, wherein the inside leads extend axially upwards from the slots.

FIG. 6 shows a perspective view of coils 30 associated with one phase of the winding arrangement of FIG. 5. The coils 30 are show in isolation from the core 12 to illustrate the positions and interconnections between the coils. As shown in FIG. 6, the coils are provided in each of four parallel paths, including a blue path 52, a green path 54, a yellow path 56, and an orange path 58. Coil connections 60 extend circumferentially between adjacent coils along the outer diameter (OD). The coil connections 60 connect to the coil leads 50 and connect adjacent coils in series. Again, FIG. 6 shows one phase of the winding arrangement 20 where all diamond coils of one color are connected together in series.

Figure 7:
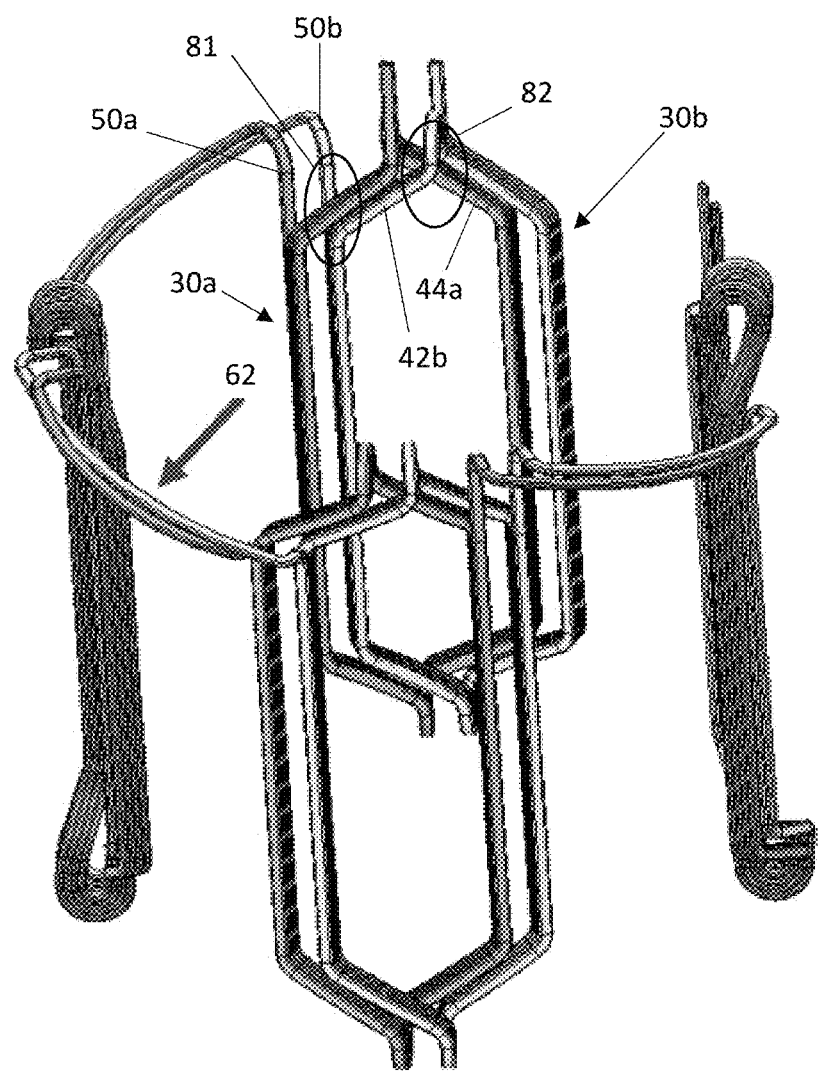
FIG. 7 shows a perspective view of half of one phase of the winding arrangement of FIG. 6 in isolation from the stator core.

FIG. 7 shows a perspective view of half of one phase (i.e., the blue path 52 and the green path 54) of the conductors of FIG. 6. FIG. 7 is intended to more clearly show the relationship between sets of adjacent coils 30a, 30b by showing the adjacent coils in isolation from other coils of winding arrangement 20. Series coil connections 60 having the crisscross arrangement (described above in association with FIG. 5) can also be seen at the arrow 62 in FIG. 7. As shown in FIG. 7, the coil leads 50, and particularly the inside coil leads, are straight coil leads 50a that extend axially out of a slot before turning radially outward and then circumferentially toward an adjacent coil. As a result, adjacent coils of the winding arrangement are interlocked. As shown in FIG. 7, each coil 30a is interlocked with the corresponding adjacent coil 30b within the winding arrangement 20 such that each coil cannot be removed from the winding arrangement in a radial direction without removal of the corresponding adjacent coil. This interlocking relationship is particularly shown by the circles 81 and 82 in FIG. 7. As shown by the circle 81, the first segment 42a of the end turn of coil 30a is arranged radially inward from the coil lead 50b of the corresponding adjacent coil 30b. At the same time, as shown by circle 82, the second segment 44a of the end turn of coil 30a is arranged radially outward from the first segment 42b of the end turn of the corresponding adjacent coil 30b. As a result, coil 30a is interlocked with the adjacent coil 30b because the second segment 44a of coil 30a is trapped (i.e., enclosed) in the radial direction between the coil lead 50b and the second segment 44b of the adjacent coil.

Figure 8:
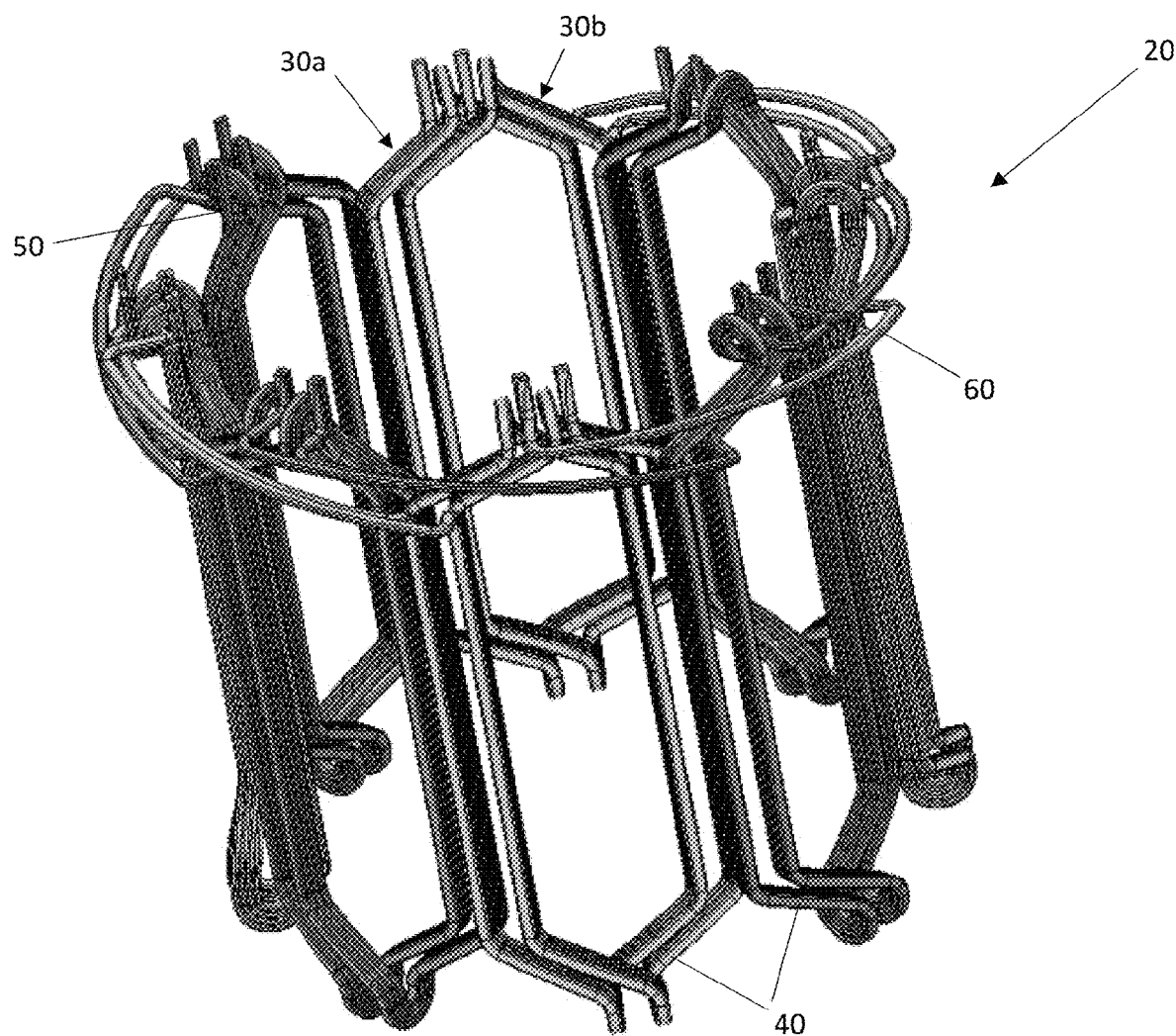
FIG. 8 shows a perspective view of an alternative embodiment of one phase of the winding arrangement of FIG. 1 in isolation from the stator core, wherein the inside leads follow the angle of the coils (i.e., instead of extending axially upwards from the slots as in the embodiment of FIGS. 6 and 7).

FIG. 8 shows a perspective view of an alternative embodiment of the coils of one phase of the winding arrangement 20. In this embodiment, the inside coil leads are not straight coil leads. Instead, the inside coil leads are all angled coil leads 50 (i.e., bent lead 50z as shown in FIG. 4) that follow the angle of the coil end turns 40 as opposed to extending directly upwards (i.e., axially) out of a slot. The angle of these coil leads 50 is helpful in allowing the winding to be inserted in a radial direction from the inside diameter (ID) of the stator core. Because the coil leads 50 are bent coil leads, the coil leads 50 are positioned immediately adjacent to the apex/vertex 46 of the end turn for the same coil 30.

Method of Making Coils for Winding Arrangement

Figure 9A:
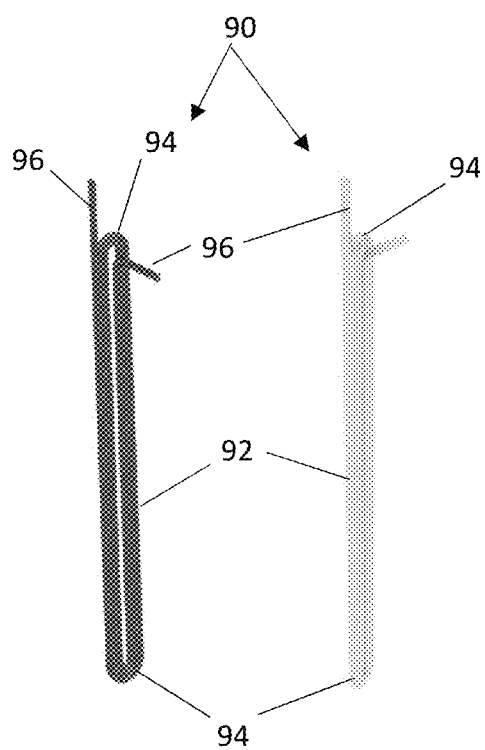
FIG. 9A is a perspective view of coil conductors prior to manufacture of the diamond coils.
Figure 9B:
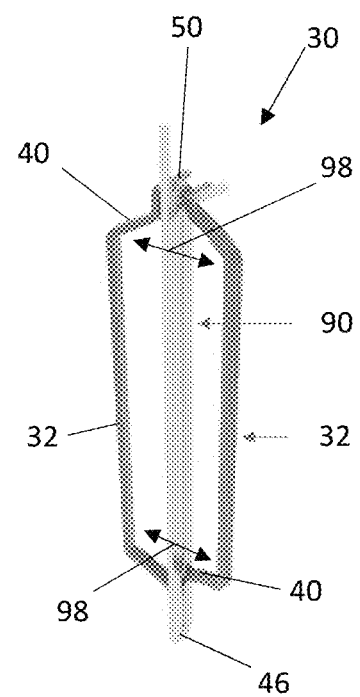
FIG. 9B is a perspective view of the coil conductors of FIG. 9A illustrating one embodiment of a method for forming the diamond coils for the winding arrangement of FIG. 1.

FIGS. 9A and 9B illustrate a method for making the diamond shape coils 30 used in the winding arrangement 20 of FIG. 8. As shown in FIG. 9A, relatively tight coil loops 90 are first wound. Because the parallel sides 92 of these loops 90 are relatively close together, the loops 90 may also be referred to as "racetrack" coils. Each racetrack coil 90 includes end turns 94 and two coil leads 96. It will be noted that two identical coils 90 are shown in FIG. 9A to illustrate that the described process is performed repeatedly for each coil 30 of the winding arrangement 20.

As shown in FIG. 9B, in order to form the coils 30 for the winding arrangement described herein, the opposite elongated sides 92 of the racetrack loops 90 are spread apart as noted by double arrows 98 to form the coils 30 with end turns 40 providing the proper pitch between the sets of legs on the left and right sides of the coil. This spreading apart of sides 92 is perpendicular to the axial direction of the sides 92. In at least one embodiment, the spreading occurs by securing the opposing end turns 94 of the loops 90 and applying opposing forces to the upper and lower portions of the parallel sides of the loops 90, as indicated by double arrows 98. In at least one embodiment wherein all of the coils are already connected (i.e., a continuous length of wire is used to form multiple coils), it is generally desirable to align all the coils in a lineal line, or in a circle, before spreading the sides. The coils may nest together better with this process.

In view of all of the foregoing, it will be recognized that a stator with diamond coils and multiple parallel paths with a balanced winding arrangement is disclosed herein. The stator generally includes one or more of the following features in various embodiments of the stator:

Diamond coils, wherein the coils are formed continuously with a single wire or individual diamond coils welded together (see FIGS. 6 and 7);

Multiple slot per pole per phase (two are shown in FIG. 5);

Multiple parallel path per phase (four are shown in FIG. 5, including the blue path 52, green path 54, yellow path 56 and orange path 58);

Each diamond coil is short pitched (pitch of 5 is shown in FIG. 5 for a normal six pitch stator);

Each pole has a set of parallel wires in inner layers of a left slot (i.e., layers 1-4), another set of parallel wires in inner layers of a middle slot (i.e., layers 1-4), a third set of parallel wires in outer layers of the middle slot (i.e., layers 5-8), and a fourth parallel wire in inner layers of a right slot (i.e., layers 5-8);

Each diamond coil has right and left legs wherein either the right or left legs are in a middle slot and the opposite legs (i.e., left or right) are in a left or right slot (i.e., if the right legs are in the middle slot then the left legs are in the left slot, and if the right legs are in the right slot then the left legs are in the middle slot);

Halfway through the winding two of the parallel wires will crisscross, causing the wires to switch positions in the three slots in the next half of the winding.

The winding arrangement 20 with diamond shaped coils as disclosed herein has numerous advantages. For example, as discussed above, the phase leads/phase leads all protrude from a single quadrant (or close to a single quadrant). Also, each parallel wire is housed in all the poles, i.e., all of the pole slot sets include all of the parallel wires. This is provides for improved electrical balancing from the parallel conductor paths of the winding arrangement in the event the rotor/stator combination is are not exactly concentric (e.g., as a result of manufacturing tolerances).

While embodiments of the winding arrangement are disclosed herein, it will be recognized that other embodiments are also possible. For example, unlike the arrangement of FIG. 5, in at least one embodiment, each pole of the winding arrangement has a set of parallel wires in inner layers of a right slot (i.e., layers 1-4), another set of parallel wires in inner layers of a middle slot (i.e., layers 1-4), a third set of parallel wires in outer layers of the middle slot (i.e., layers 5-8), and a fourth parallel wire in inner layers of a left slot (i.e., layers 5-8). Accordingly, when a slot set is described herein having three contiguous slots, including a left slot, middle slot, and right slot, it will be recognized that the terms left, middle and right may be determined based on a perspective from either the ID or the OD.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
a core including a plurality of slots; and
a multi-phase winding arrangement positioned on the core, each phase of the winding arrangement comprising a plurality of parallel paths defining a plurality of poles for the stator,
wherein each parallel path includes a plurality of coils positioned on the core, each coil defined by coil legs and end turns, the coil legs including left legs and right legs extending through the slots of the core, the left legs and right legs of each coil connected by first end turns at one end of the core and second end turns at an opposite end of the core,
wherein each pole is associated with a pole slot set comprised of multiple slots,
wherein each pole slot set includes a left slot, a middle slot, and a right slot, and
wherein, for each pole slot set, legs for each parallel path extend through one slot of said pole slot set such that conductors for all of the parallel paths of said phase of the winding arrangement are retained in each pole slot set, left legs of a first coil are in an outer half of the middle slot, and right legs of the first coil are in an inner half of a left slot of a right adjacent pole slot set.

2. The stator of claim 1, wherein each of the plurality of coils are diamond shaped coils.

3. The stator of claim 2, wherein the multi-phase winding arrangement is a three phase winding arrangement.

4. The stator of claim 2, wherein each parallel path further includes series connections extending between the plurality of coils, wherein the series connections are positioned radially outward from the first end turns at the one end of the core.

5. The stator of claim 4 wherein at least two of the series connections crisscross such that a coil position associated with each series connection switches slot positions in an adjacent pole slot set.

6. The stator of claim 2, the winding arrangement further comprising a first lead and a second lead for each parallel path, wherein all of said leads are arranged within a 100° arc defined on the core.

7. The stator of claim 6, wherein all of said leads are arranged within a 90° arc defined on the core.

8. The stator of claim 1, wherein the plurality of parallel paths is defined by four parallel paths for each phase of the winding arrangement.

9. The stator of claim 8, wherein a number of slots-per-phase-per-pole of the winding arrangement is two.

10. The stator of claim 9, wherein each pole slot set includes three contiguous slots defining a left slot, a middle slot and a right slot.

11. The stator of claim 10, wherein eight layers of conductors are arranged in each slot, and wherein each pole slot set defines a 4-8-4 conductor arrangement such that four conductors of a first parallel path are arranged in inner layers of the left slot, four conductors of a second parallel path are arranged in inner layers of the middle slot, four conductors of a third parallel path are arranged in outer layers of the middle slot, and four conductors of a fourth parallel path are arranged in outer layers of the right slot.

12. The stator of claim 1, wherein for each pole slot set, the left legs of a second coil are in an outer half of the right slot and the right legs of the second coil are in the middle slot of the right adjacent pole slot set.

13. The stator of claim 12, wherein for each pole slot set, the right legs of a third coil are in an inner half of the middle slot and the left legs of the third coil are in the right slot of a left adjacent pole slot set.

14. The stator of claim 1, wherein for each pole slot set, the right legs of a fourth coil are in an inner half of the left slot and the left legs of the fourth coil are in an outer half of the middle slot of the left adjacent pole slot set.

15. A stator for an electric machine comprising:
a core including a plurality of slots; and
a multi-phase winding arrangement positioned on the core, each phase of the winding arrangement comprising a plurality of parallel paths defining a plurality of poles for the electric machine,
wherein each parallel path includes a plurality of coils positioned on the core and a plurality of coil connections extending between the plurality of coils,
wherein each coil is defined by coil legs and end turns, the coil legs including left legs and right legs extending through the slots of the core, the left legs and right legs of each coil connected by first end turns at one end of the core and second end turns at an opposite end of the core,
wherein each pole of the winding arrangement is associated with a pole slot set including at least two slots,
wherein slots containing the coil legs of a first parallel path are positioned to the left of slots containing the coil legs of a second parallel path for a first group of pole slot sets; and
wherein at least two of the coil connections crisscross one another such that slots containing the coil legs of the first parallel path are positioned to the right of slots containing the coil legs of the second parallel path for a second group of the pole slot sets.

16. The stator of claim 15 wherein the plurality of coils are diamond shaped coils, wherein the coil connections provide series connections between the plurality of coils, and wherein the at least two of the coil connections crisscross one another at a position radially outward from the first end turns.

17. A stator for an electric machine comprising:
a core including a plurality of slots; and
a multi-phase winding arrangement positioned on the core, each phase of the winding arrangement comprising a plurality of parallel paths defining a plurality of poles for the stator,
wherein each parallel path includes a plurality of coils positioned on the core, each coil a diamond shaped coil defined by coil legs and end turns, the coil legs including left legs and right legs extending through the slots of the core, the left legs and right legs of each coil connected by first end turns at one end of the core and second end turns at an opposite end of the core,
wherein each parallel path further includes series connections extending between the plurality of coils, wherein the series connections are positioned radially outward from the first end turns at the one end of the core, and wherein at least two of the series connections crisscross such that a coil position associated with each series connection switches slot positions in an adjacent pole slot set, wherein each pole is associated with a pole slot set comprised of multiple slots, and wherein, for each pole slot set, legs for each parallel path extend through one slot of said pole slot set such that conductors for all of the parallel paths of said phase of the winding arrangement are retained in each pole slot set.

18. The stator of claim 17, wherein the plurality of parallel paths is defined by four parallel paths for each phase of the winding arrangement, and wherein a number of slots-per-phase-per-pole of the winding arrangement is two.

19. The stator of claim 18, wherein each pole slot set includes three contiguous slots defining a left slot, a middle slot and a right slot.

20. The stator of claim 19, wherein eight layers of conductors are arranged in each slot, and wherein each pole slot set defines a 4-8-4 conductor arrangement such that four conductors of a first parallel path are arranged in inner layers of the left slot, four conductors of a second parallel path are arranged in inner layers of the middle slot, four conductors of a third parallel path are arranged in outer layers of the middle slot, and four conductors of a fourth parallel path are arranged in outer layers of the right slot.

* * * * *